United States Patent [19]

Conley et al.

[11] Patent Number: 5,001,320
[45] Date of Patent: Mar. 19, 1991

[54] WELDING FIXTURES BY WHICH PIPE ENDS ARE JOINED TOGETHER

[76] Inventors: Ralph N. Conley; Michael N. Pierce, both of P.O. Box 3226, Odessa, Tex. 79760

[21] Appl. No.: 270,812

[22] Filed: Nov. 14, 1988

[51] Int. Cl.[5] ............................................. B23K 9/035
[52] U.S. Cl. .................................. 219/61; 219/60 R; 285/55
[58] Field of Search .................... 285/55; 219/104, 61, 219/60 R, 137 R; 138/103; 118/408

[56] References Cited
U.S. PATENT DOCUMENTS

| | | | |
|---|---|---|---|
| 2,324,928 | 7/1943 | Hill | 219/137 R |
| 2,895,747 | 7/1959 | Bland et al. | 285/55 |
| 3,325,191 | 6/1967 | Yates | 285/55 |
| 3,890,483 | 6/1975 | Webster | 219/104 |
| 3,892,032 | 7/1975 | Bagnulo | 29/458 |
| 3,965,555 | 6/1976 | Webster et al. | 285/55 |
| 3,974,306 | 8/1976 | Inamura et al. | 118/408 |
| 4,243,699 | 1/1981 | Gibson | 118/408 |
| 4,355,664 | 10/1982 | Cook et al. | 138/103 |
| 4,357,745 | 11/1982 | Chlebowski | 285/55 |
| 4,611,833 | 9/1986 | Lescaut | 285/55 |
| 4,640,532 | 2/1987 | Pope | 285/55 |
| 4,681,349 | 7/1987 | Press et al. | 285/55 |

Primary Examiner—Clifford C. Shaw
Attorney, Agent, or Firm—Marcus L. Bates

[57] ABSTRACT

A pipe welding connector for joining pipe sections that have been internally coated with a heat sensitive coating material. The connector is arranged so that during the welding process, the coating remains below its degradation temperature. The connector has a first fixture at the end of one pipe section and a second fixture at the end of another pipe section. The first and second fixtures, when brought into abutting relationship, can be butt welded together to form the pipe welding connector. The second fixture is a cylinder that outwardly diverges into a bell and the opposed marginal end is of constant inside diameter and is attached about the exterior of a pipe section. Part of the pipe section extends from the belled marginal end and forms a stinger. The first fixture has an enlarged interior that telescopingly receives the stinger therein and further includes a belled marginal terminal end of a diameter equal to the diameter of the belled marginal end of the second fixture. This unique structure allows a first fixture to be formed on one end of a pipe section and the second fixture to be formed on the other end of the same pipe section so that series connected pipe sections can be welded together to form a pipe line without destroying the internal coating.

5 Claims, 2 Drawing Sheets

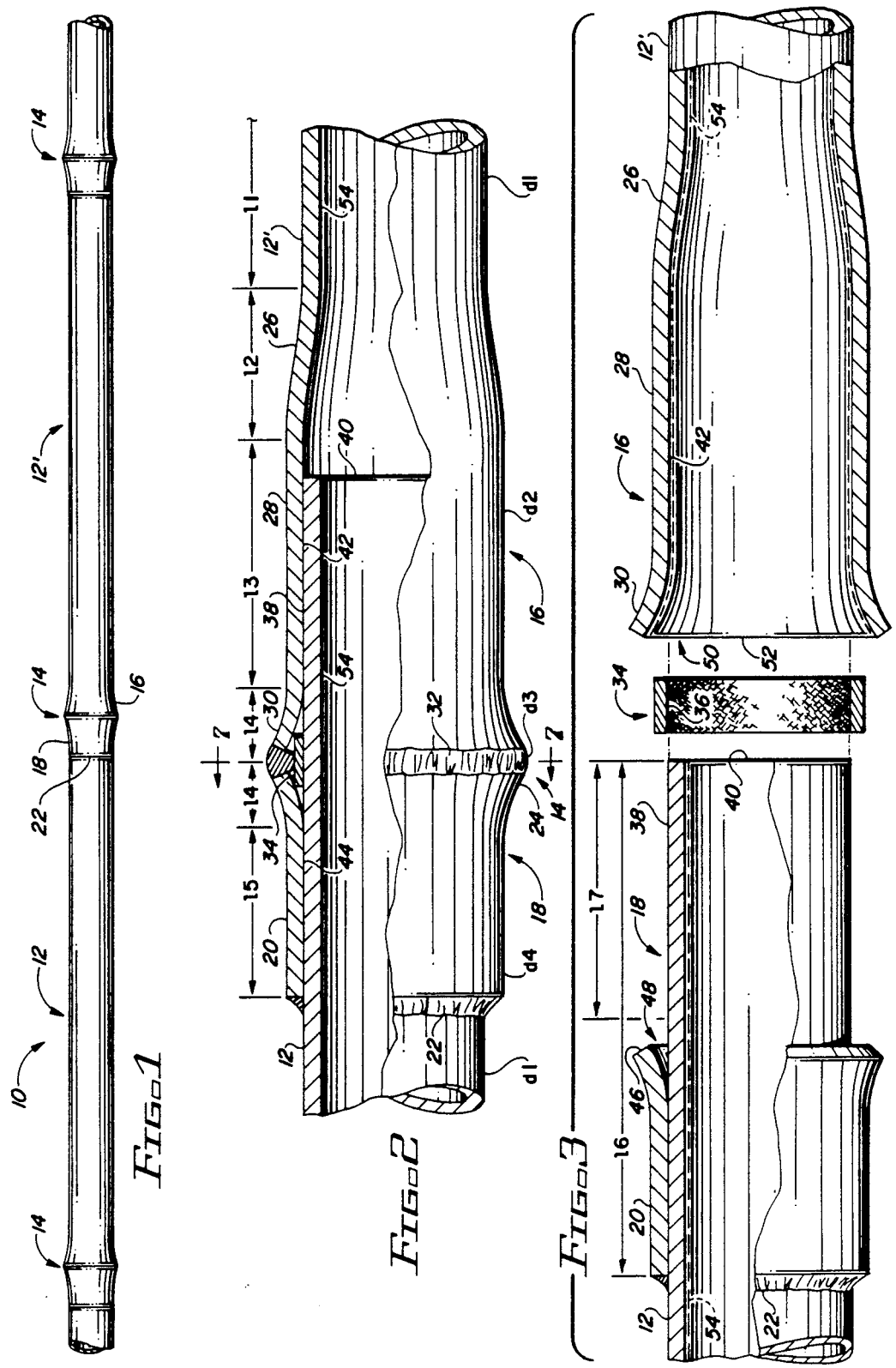

WELDING FIXTURES BY WHICH PIPE ENDS ARE JOINED TOGETHER

BACKGROUND OF THE DISCLOSURE

A pipeline, or long length of pipe, is made up of a plurality of joints of pipe, or pipe sections. Each pipe section has opposed ends joined to another pipe section. A pipeline often varies from less than one inch inside diameter to more than a foot outside diameter. Sometimes, the fluid conveyed by a pipeline is corrosive. Therefore, the interior of the individual pipe sections is often coated with a heat sensitive plastic material in order to protect the internal surface of the pipe sections and thereby elongates the life of a pipeline.

When the pipe ends of internally coated pipe sections are joined by butt welding, for example, the heat from the welding operation destroys a substantial amount of the internal heat sensitive coating at the joined area. This is especially so with an epoxy resin coating which melts at about 420° F. It stands to reason that the welded joint, which is usually the strongest part of the pipeline, soon becomes the weakest part of the pipeline due to the deleterious effects of corrosion acting on the unprotected joined area of the pipe sections.

It would therefore be desirable to be able to join together pipe sections into a continuous length in such a manner that the internal coating of the pipe is not harmed. This heretofore unknown and desirable welding operation would provide a continuous length of undamaged, internally coated pipe which should last for many years, and which would be much safer to persons and things in close proximity to the pipeline because its structural integrity would remain at its designed strength for an extended length of time.

A few previous solutions to this perplexing problem has been suggested by the following U.S. patents:
U.S. Pat. No. 2,895,747, 07/21/59, Bland et al.
U.S. Pat. No. 3,325,191, 06/13/67, Yates.
U.S. Pat. No. 3,890,483, 06/17/75, Webster.
U.S. Pat. No. 3,892,032, 07/01/75, Bagnulo.
U.S. Pat. No. 3,965,555, 06/29/76, Webster et al.
U.S. Pat. No. 4,355,664, 10/26/82, Cook et al.
U.S. Pat. No. 4,357,745, 11/09/82, Chlebowski.
U.S. Pat. No. 4,611,833, 09/16/86, Lescaut.
U.S. Pat. No. 4,640,532, 02/03/87, Pope.
U.S. Pat. No. 4,681,349, 07/21/87, Press et al.

However, it is evident that none of the cited references provide a pipe connector as defined by the claims of this invention.

The present invention is an improvement over all of the above listed, previous patents because of the preservation of the structural integrity of the effected weldment over a long period of time; the lower cost of the novel pipe sections; the cost of the pipeline building operation is reduced: the heat flow characteristics are uniquely controlled during the joining of adjacent pipe sections; and particularly, the protection of the internal coating of the joined area of the pipe sections during the joinder operation.

SUMMARY OF THE INVENTION

This invention comprehends an improved pipe welding connector for joining pipe sections together that have been internally coated with a heat sensitive coating material. The connector is arranged in two coacting parts, located on opposed ends of a pipe section, so that during the process of butt welding a plurality of the pipe sections together, the connector and pipe section cooperate together as a heat sink to dissipate heat from the arc weld in a new and unobvious manner, whereby the internal heat sensitive coating material adjacent to the butt weld remainns below its degradation temperature. More specifically, the connector is made of a first fixture and a second fixture, each being arranged at opposite ends of a pipe section, so that a first fixture is formed at the end of one pipe section and a second fixture is rigidly affixed at the end of another pipe section. The first and second fixtures, when brought into abutting, axially aligned relationship, can be butt welded together at a location spaced from the surface of the underlying pipe to thereby form an unusual and desirable pipe welding connector having unexpected attributes which are achieved through the present invention.

The second fixture includes a cylinder having one marginal end that outwardly diverges into a bell, and the opposed marginal end of the cylinder is of constant inside diameter and is received in fixed relationship about the exterior of a pipe section. A stinger, in the form of a marginal terminal length of the pipe section extends outwardly from the belled marginal end of the second fixture. Hence, the terminal ends of the bell and stinger are axially spaced.

The first fixture has an enlarged interior along a marginal length thereof that telescopingly receives the stinger in close tolerance relationship therewithin, and further includes a belled marginal terminal end of the same configuration and diameter as the belled marginal terminal end of the second fixture. This unique structure allows a first and second fixture respectively, to be formed on the opposed ends of a pipe section prior to coating the inside surface of the pipe section. A plurality of the previously prepared and coated pipe sections can subsequently be butt welded together to form the recited connection, thereby providing a method of building a pipeline without destroying the internal coating thereof, and without significantly changing the metallic composition of the fluid conveying conduit.

A primary object of this invention is the provision of both method and apparatus for joining coated pipe sections into a pipeline in a new and unobvious manner which protects the internal coating thereof.

Another object of this invention is the provision of a method of joining pipe sections into a pipeline wherein the pipe sections previously have been coated with a heat sensitive coating material and the opposed ends of the pipe sections have been provided with a first and a second fixture that can be butt welded to provide a connector wherein the connector provides a controlled heat flow path from the welding process that occurs in such a manner that the coating is not harmed.

A still further object of the present invention is the provision of a connector for joining pipe sections together that previously have been internally coated with a heat sensitive coating material, wherein the connector is arranged in two coating parts located on opposed ends of a plurality of pipe sections so that during the process of butt welding the pipe sections together, the connector dissipates heat from the arc weld in a manner whereby the coating next to the butt weld remains below its degradation temperature, and the metallic structure and chemical composition of the pipe section remains substantially unchanged.

Another and still further object of this invention is the provision of apparatus formed at the confronting ends of adjacent pipe sections that are butt welded together to form a pipeline without damaging a synthetic resin coating previously applied to the interior of the pipe sections.

An additional object of this invention is the provision of a pipe welding connector device comprising a male stinger that is formed on one pipe end and is received within a female socket that is formed on an adjacent pipe end of two pipe sections to be joined. The stinger is telescopingly received within the socket. An outwardly directed, circumferentially extending member is additionally affixed on each of the pipe sections which abuttingly engage and are butt welded together, thereby joining the two pipe sections together by indirectly welding one pipe section to the other.

These and various other objects and advantages of the invention will become apparent to those skilled in the art upon reading the following detailed description and claims and by referring to the accompanying drawings.

The above objects are attained in accordance with the present invention by the provision of a method for use with a combination of elements which are fabricated in a manner substantially as described in the above abstract and summary.

BRIEF DESCRIPTION OF THE DRAWINGS

FIG. 1 is a fragmentary, elevational view of a length of pipeline made in accordance with the present invention;

FIG. 2 is an enlarged, longitudinal, part cross-sectional, broken, detailed view of part of the apparatus disclosed in FIG. 1;

FIG. 3 is a part cross-sectional, disassembled view of the apparatus disclosed in FIG. 2;

DETAILED DESCRIPTION OF THE PREFERRED EMBODIMENTS

Figure 4:
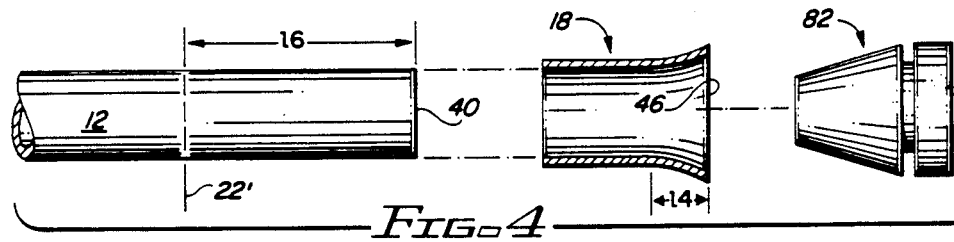
FIG. 4 is a reduced, disassembled view of part of the apparatus disclosed in FIG. 3.

FIG. 1 of the drawings discloses a pipeline 10 comprised of a plurality of pipe sections 12 and 12' joined together by a pipe welding connector 14 made in accordance with the present invention. The pipe welding connector 14 comprises a first fixture 16 attached to pipe section 12' and a second fixture 18 connected to pipe section 12. Accordingly, each of the pipe sections 12, 12' have a first fixture 16 located on one end thereof and a second fixture 18 located on the opposed end thereof so that confronting or facing ends of adjacent pipe sections can be arranged with a first fixture 16 confronting a second fixture 18 and joined to form the pipe welding connector 14.

In this disclosure, the term "fixture" is intended to described a preformed component that is an integral part of a pipe section and is designed to be welded to another fixture and thereby enable pipe sections to be joined in series, axially aligned relationship.

FIGS. 2 and 3 disclose the details of the novel pipe welding connector 14. The first fixture is seen on the right hand side of the drawing while the second fixture is on the left hand side thereof. The second fixture of the connector 14 comprises a cylinder 20 that has a terminal end thereof previously lap-welded at 22 to a medial part of pipe 12, and further includes an opposed marginal belled terminal end at 24.

The first fixture 16 is enlarged in diameter in two different steps, with the first enlargement occurring over the marginal area 26 along the indicated length L2 which results in a constant diameter length 28, as indicated by length L3. The marginal terminal end is outwardly curved into a bell 30 along the indicated length L4. The belled ends, 24 and 30, respectively, of fixtures 16 and 18, respectively, are made more or less complementary respective to one another.

In FIG. 2, L1 indicates the length of pipe section 12' that is of constant or nominal diameter; L2 indicates the length of the pipe that outwardly diverges due to the first expansion step; while L3 indicates the length of constant diameter enlarged pipe that is of an inside diameter equal to the outside diameter of the pipe at L1. It will be noted that the belled part 24 of cylinder 20 progressively diverges over a length L4. The length L4 is equal to the length of the belled part 30 which occurs over the length L4 of the first fixture.

The configuration of the outwardly curved marginal length L4—L4 of the first and second fixtures can take on most any desired outwardly curved form, and preferably has the characteristics of a truncated hyperbola, and therefore is a parabolic section, or a conic section; and, it can be an ordinary segment of an outwardly curved annular geometrical solid, all of which are referred to herein simply as a "bell", or "belled" marginal length. This configuration leaves the circumferentially extending confronting edges of the fixtures axially aligned and having equal diameters.

In FIGS. 2 and 3, a heat barrier 34, in the form of a cylindrical, heat resistant wick, is placed in underlying relationship respective to the area that is to receive the butt weld 32. The heat barrier can be made of heat resistant fabric-like material saturated in a suitable liquid coolant, such as water, or alternatively, can be a ceramic cylinder. The heat barrier 34 insulates the immediate circumferentially extending outer surface area of the underlying pipe 12 from the molten metal at 32 during the welding of the connector. In FIG. 3, numeral 36 indicates the inside diameter of heat barrier 34, while numeral 38 indicates the outside diameter of the marginal pipe end 12 that protrudes beyond the belled end of cylinder 20. Numeral 38 is therefore a stinger having a terminal end 40 and is of an outside diameter that is telescopingly received in close tolerance relationship within the inside diameter 42 of the constant diameter part 28 of the first fixture. Numeral 46 indicates the circumferentially extending free end of the belled end of cylinder 20. The belled marginal end 24 of cylinder 20 forms a cavity 48 between stinger 38 and the interior of belled part 24, while the numeral 50 similarly indicates a cavity that is formed between the belled marginal end of the first fixture and the stinger 38. The cavities 48 and 50 are approximately equal to one another as may be noted in the assembled configuration of FIG. 2.

The dot-dash line noted by numeral 54 is a coating. The coating can be any number of different synthetic resins that are applied by numerous, difrerent processes in order to provide the entire internal surface area of each of the pipe sections with a thin uniform coating. Attention is directed to U.S. Pat. No. 3,974,306; U.S. Pat. No. 4,243,699; and to the art cited therein for some of the specific details of internal coating methods for pipe.

Figure 6:
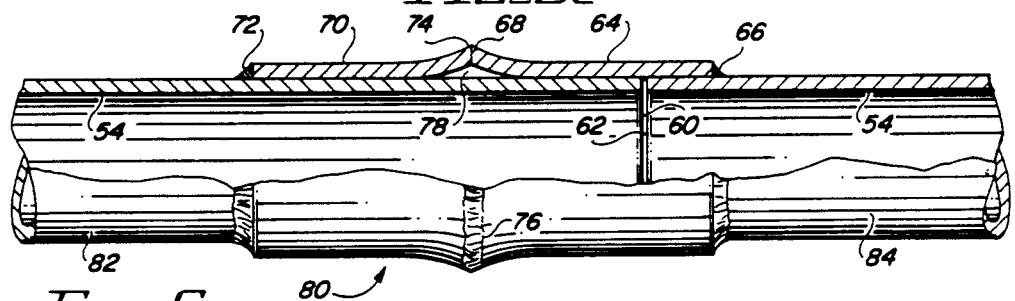
FIG. 6 is a fragmentary, longitudinal, part cross-sectional view of a second embodiment of the present invention; and, FIG. 7 is a cross-sectional view taken along line 7—7 of FIG. 2.
Figure 7:
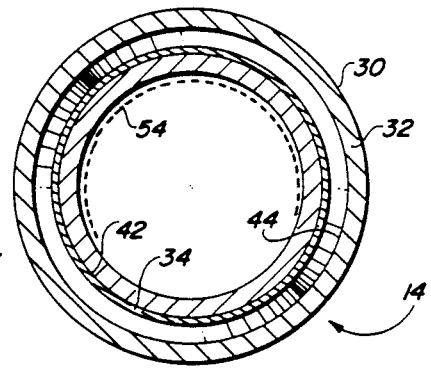

FIG. 6 sets forth a modification of the embodiment previously described in conjunction with FIGS. 2, 3 and 7. In FIG. 6, the pipe ends 60, 62 preferably are slightly spaced but could abut one another, and are of equal diameter. There is a first fixture comprising a first cylinder 64 that is lap-welded at 66 to a medial circumferentially extending area of the pipe section on the right hand side of the Figure. Numeral 68 indicates the belled marginal end of the cylinder 64.

The pipe section located on the left hand side of the Figure is provided with a cylinder 70 that is lap-welded at 72 to a medial circumferentially extending area of the pipe section. The cylinder 70 is belled at 74 to provide a cavity 78 of a symmetrical configuration. Numerals 68 and 74 indicate the abutting, confronting edges of the first and second fixtures, while numeral 76 in the lower part of the Figure, indicates a butt weld that rigidly connects the two cylinders 64 and 70 to one another and thereby indirectly connects the adjacent confronting ends of the pipe sections together. Numeral 80 generally indicates the completed pipe welding connector of the second embodiment.

It will be noted that pipe section 82 and cylinder 70 are substantially identical in construction to the second fixture of the first embodiment, while the pipe section 84 and cylinder 64 have some similarities to the second fixture; however, it will be noted that the first fixture is lap-welded at location 66 and with respect to pipe end 62 such that a socket is provided of a diameter that receives the stinger of the second fixture in close tolerance relationship therewithin. The heat barrier wick 34 of FIG. 3 can be included in the cavity 78 of FIG. 6 to provide additional protection of the interior pipe coatings.

The second fixture 18 of FIGS. 1-3 can be attached to the pipe section 12 in accordance with FIG. 4. In FIG. 4, a cylinder 20 can be a pup joint cut from a length of appropriate inside diameter pipe. One marginal end of cylinder 20 is expended along L4 by the diagrammatically indicated expansion mechanism 82. Expansion mechanism 82 is any known tool or device that can be utilized for achieving a flared or belled marginal end of the cylinder 20. Further, the second fixture 18 can be cast or forged as may be desired. Numeral 22' in FIG. 4 indicates the location of the lap-weld. L6 indicates the length between the lap-weld and the terminal end 40 of the pipe joint 12.

In FIG. 2, d1 is the diameter of pipe 12, 12' along L1; d2 is the diameter of the pipe along L3; and d3 is the diameter of the butt welded connection and therefore, is the maximum outside diameter of the string of pipe. The cylinder 20 has a diameter d4 which usually will equal d2, noting that stinger 30 is closely received within the interior of members 20 and 28.

Figure 5A:
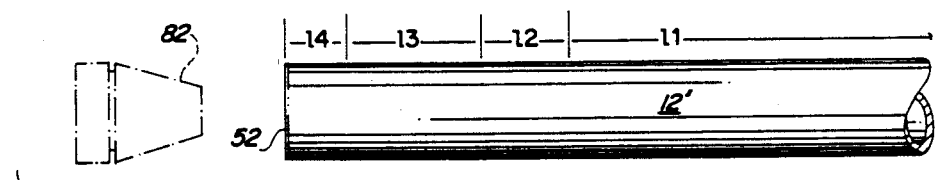
FIGS. 5A, 5B, and 5C are fragmentary, elevational, reduced views which disclose part of the apparatus of FIG. 3 while it is being fabricated.
Figure 5B:
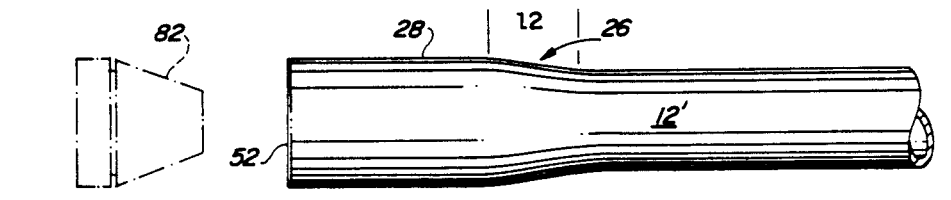
Figure 5C:
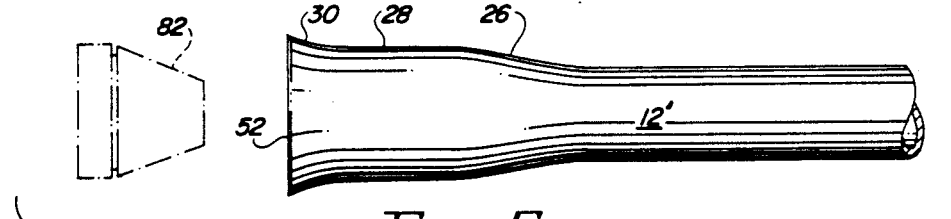

FIGS. 5A, 5B, and 5C illustrate a step-by step process by which the first fixture 16 of FIGS. 1-3 is formed from along the marginal end of an ordinary pipe. The pipe 12, 12' can be of various different design such as, for example, oil field production or line pipe.

In FIG. 5A, the expansion device 82 enters the interior of pipe 12' at a location to make the first expansion along length L2, thereby providing an enlarged, constant diameter length L3 that is of sufficient diameter to snugly receive the stinger 38 therein. Then expansion device 82 makes the belled marginal length 30 along length L4 of the pipe joint 12'. The resultant structure is seen on the right hand side of FIG. 3 and in FIG. 5C.

In operation, each pipe section is provided with a first fixture 16 at one marginal end thereof and a second fixture 18 at the other marginal end thereof. Then the pipe sections are coated at 54. The pipe sections are then placed in confronting relationship with unlike fixtures abutting one another in the manner of FIG. 3. The heat barrier 34 is slidably received about stinger 38 and properly positioned respective to cavity 48 so that when the confronting ends 46 and 52 abuttingly engage one another, the illustrated butt weld 32 can be effected, thereby joining pipe sections 12 and 12' to one another with great strength.

The operations set forth in FIGS. 5A, 5B, and 5C can be carried out in the shop under controlled conditions so that the marginal end of pipe 12' can receive proper preheat prior to deformation, as may be desired. This minimizes loss of structural integrity of the deformed end of the section that may be attributed to uneven or undesirable heating as well as undesirable stress and strain that may result from the operation of the expansion tool 82.

Welded pipe joints usually are exposed to a complex stress pattern as a result of the high temperature gradients that must be present in the metal in order for the weld to be properly effected. By the present invention, the undesirable stress pattern of the welded joint is not as critical as in the prior art direct butt welding of two pipe sections for the reason that the final butt welding occurs on a secondary member that isolates the field weld from the pipe sections. The secondary member, therefore, is previously shop welded under controlled conditions that minimizes the undesirable heat induced stress patterns to the pipe section at a location spaced from the terminal end of the pipe.

After the pipe sections have been provided with the first and second fixtures, they are individually coated on the inside thereof, using the above described coating techniques, for example. The pipe sections subsequently are easily field welded because no auxiliary alignment means need be employed, noting that the stinger perfectly aligns the adjacent joints of unwelded pipe sections. Moreover, as the stinger of the second fixture is forced into the socket of the first fixture, the coating 54 provides an unusually tight, efficient seal between the adjacent marginal ends of the two pipe sections, thereby providing unexpected advantages from the present invention.

The circumferentially extending edges 46 and 52 at the free ends of the bells are brought to the molten state during the welding process, and the heat from the arc of the welding electrodes provides a liquid metal bridge 32 across the gap between the coacting fixtures 16 and 18. After the electric arc has completed the weld, the liquid solidifies and joins the edges together, as seen at d3 in FIG. 2.

As the butt weld 32 is being formed to integrally join edges 46 and 52, heat transfer occurs along each of the cylinders 20 and 28 where it is dissipated into the atmosphere due to radiation and convection, and also is transferred into pipe sections 12 and 12' along length L3 and L5. There is an interface 42 and 44 between the cylinders 20 and 28 and pipe surface 12 that forms a barrier with which the heat transfer mechanism must contend. The only direct heat transfer into pipe 12 occurs through the lap weld 22 and along cylinder 28. However, the elevation in temperature at this area is not of a magnitude to damage the internal pipe coating 54 because the high temperature of the molten metal has been progressively reduced by the heat sink properties of the connector apparatus 14 as the heat flows along its circuitous path to this location.

As the molten metal of the electric arc forms weld 32, the heat barrier 34 prevents direct radiation thereof against the stinger 38. Accordingly, there is no direct transfer of heat from the arc welding process directly into a fluid carrying part of either of the joined together pipe sections 12 or 12'.

With respect to the first fixture 16, the heat transfer occurs back along the constant diameter cylindrical part 28, and along length L3 which lowers the temperature thereof as the heat migrates toward the unprotected coating located to the right of edge 40 of the stinger. The heat that travels in this direction is dissipated over such a large area L3 that the temperature of the internal coating is not harmed. Any coating present at interface 38, 42 may reach the molten state near heat shield 34, which is not considered to be the interior of the pipe section, and which is not considered a drawback so long as the integrity of coating 54 at end 40 of stinger 38 is not injured.

The terminal end 40 preferably is round with a suitable radius to avoid any sharp edges. The end 40 is provided with a protective coating as seen at 54 that extends about the end 40 and includes a generous area of the outside diameter of the stinger 38. This forms a sealant between the outside diameter of the stinger and the inside diameter 42 of the fixture 16.

I claim:

1. A pipe welding connector for joining series connected pipe sections that are internally coated with a heat sensitive coating material, while the coating remains below its degradation temperature; said connector comprising a first fixture integrally attached at the end of one pipe section and a second fixture integrally attached at the end of another pipe section; said first fixture of one pipe section, when brought into abutting relationship with said second fixture of another pipe section, together form said pipe welding connector and can be butt welded together and thereby form said pipe sections into a continuous length of pipeline;

said second fixture is of annular configuration and concentrically arranged about said another pipe section and having a marginal end spaced outwardly from said another pipe section and diverged into a bell, and an opposed marginal end is attached to the another pipe section, with there being a stinger in the form of a marginal terminal length of the another pipe section extending beyond the belled marginal end of the second fixture;

a marginal length of said first fixture has an inside diameter of a size that telescopingly receives said stinger in close tolerance relationship therein and thereby transfers a bending load between adjacent pipe sections; and, said first fixture further includes a belled marginal terminal end of a diameter substantially equal to the diameter of the belled marginal end of the second fixture; there is a cavity formed between the stinger and the belled marginal terminal ends of the first and second fixtures when the belled ends of the first and second fixtures abut one another;

means forming a heat barrier about a medial length of said stinger in alignment with the confronting ends of the bells of the first and second fixtures, and within said cavity for reducing the rate at which heat is transferred from the connector into the interior of the pipe section during a subsequent welding of the first and second fixtures.

whereby; said first and second fixtures of adjacent sections of series connected pipe sections can be butt welded together without damaging the interior coating of the pipe sections, and thereby connect pipe sections into a long length of pipeline.

2. The pipe welding connector of claim 1 wherein said first fixture is a cylinder having a belled marginal end opposed to a constant diameter marginal length, with said constant diameter marginal length being of a size to telescopingly receive a marginal end of the stinger of the second fixture and positioned on the one pipe section whereby the confronting ends of the first and second fixtures on adjacent pipe sections abut one another and can be butt welded in the before described manner.

3. A pipe welding connector for welding pipe sections together that have been internally coated with a heat sensitive coating material; said pipe connector has heat transfer characteristics whereby during the welding process the connector transfers heat into the pipe sections at a rate to maintain the temperature of the coating below its degradation temperature;

said connector comprises a first fixture and a second fixture, said first fixture is attached at one end thereof to one pipe section and said second fixture is attached at one end thereof to a second pipe section; said first and second fixtures, when brought into axially aligned abutting relationship, can be butt welded together and thereby connect said one pipe section to said second pipe section;

said second fixture is in the form of an annular member concentrically arranged about said second pipe section and having a marginal end spaced from said pipe section, the last said marginal end outwardly diverges and terminates in a circumferentially extending edge to describe a bell-like structure; and, the opposed marginal end of the second fixture is rigidly affixed to the pipe section, with there being a marginal terminal length of the pipe section extending beyond said circumferentially extending edge to thereby form a stinger;

said first pipe section has a constant diameter length that is enlarged along a marginal length thereof to form a medial length of said first fixture and to telescopingly receive said stinger in close tolerance relationship therein and thereby align the first and second fixtures along the longitudinal central axis thereof and transfer bending loads therebetween; said first fixture further includes an outwardly diverging annular member that terminates in a circumferentially extending edge that is of greater diameter than said constant diameter length and is spaced outwardly from the stinger and thereby forms a belled marginal terminal end that terminates in said circumferentially extending edge that has a diameter equal to the diameter of the belled marginal end of said second fixture;

there is a cavity formed between the stinger and the belled ends of said first and second fixture;

an annular heat barrier mounted about at least part of said stinger and positioned within said cavity in aligned, concentric relationship respective to the terminal ends of the confronting bell shaped members of said first and second fixtures to thereby control the rate of heat transfer that flows towards the pipe stinger during the welding process that is subsequently required to join the first and second fixtures together to form said connector;

whereby; the first and second fixtures of series connected pipe sections can be welded together to provide said connector and to join the pipe sections into a long length of pipeline.

4. A method of connecting adjacent pipe sections together in series relationship by butt welding the adjacent pipe sections to form a continuous conduit for conveying fluids, while elevating the interior surface of the pipe section to a predetermined maximum temperature; comprising the steps of:

forming a first fixture on one end and a second fixture on the other end of a pipe section;

enlarging the inside diameter of a marginal length of said first fixture to telescopingly receive the marginal end of another said pipe section in close tolerance relationship therewithin; and, increasing the diameter of the terminal ends of the first and second fixtures to outwardly diverge the ends of the fixtures in a direction towards the end of the respective pipe section to thereby make the terminal end of the first fixture complementary respective to the terminal end of the second fixture;

sliding the marginal end of said second pipe section into the constant diameter marginal end of said first fixture until the confronting belled ends of said first and second fixtures abut one another;

welding the abutting ends of said first and second fixtures, thereby joining adjacent pipe sections together while elevating the temperature of the welded interior surface of the pipe sections to a value which is below said predetermined maximum temperature;

and further including the steps of making the belled ends of the first and second fixtures of a diameter to form a cavity between the connector and the marginal end of the pipe.

5. The method of claim 4, and further including the step of placing a heat shield about the marginal end of the pipe in underlying relationship respective to the butt ends of the fixtures.

* * * * *

UNITED STATES PATENT AND TRADEMARK OFFICE
CERTIFICATE OF CORRECTION

PATENT NO. : 5,001,320
DATED : MARCH 19, 1991
INVENTOR(S) : RALPH N. CONLEY and MICHAEL N. PIERCE It is certified that error appears in the above-identified patent and that said Letters Patent is hereby corrected as shown below:

Column 4, line 7, insert --section-- after "pipe" ;
      Line 47, insert --section-- after "pipe" ;
      Line 51, delete "pipe" and insert --of pipe section-- before "12" .
Column 5, line 53, insert --sections-- after "pipe" ;
      Line 63, insert --sections-- after "pipe" ;
      Line 66, insert --section-- after "pipe" .
Column 6, line 19, insert --section-- after "pipe" .
Column 9, line 16 should read "the pipe sections during the welding to a temperature which is below a predetermined maximum tempera-" ;
      Line 19 should read "on the other end of each of said pipe sections;" ;
      Line 22 should read "ginal end of an adjacent pipe section in close toler- " .

UNITED STATES PATENT AND TRADEMARK OFFICE
CERTIFICATE OF CORRECTION

PATENT NO. : 5,001,320
DATED : MARCH 19, 1991
INVENTOR(S) : RALPH N. CONLEY and MICHAEL N. PIERCE It is certified that error appears in the above-identified patent and that said Letters Patent is hereby corrected as shown below:

Column 10, line 6 should read "sliding said marginal end of an adjacnet pipe section" ;
        Line 18 should read "form a cavity respective to said mar- " ;
        Line 19 should read "ginal end of an adjacent pipe section. " ;
        Line 21 should read "step of placing a heat shield about said marginal end of " ;
        Line 22 should read "an adjacent pipe section and in underlying relationship respective to the butt " .

Signed and Sealed this

Third Day of November, 1992

Attest:

DOUGLAS B. COMER

*Attesting Officer*      *Acting Commissioner of Patents and Trademarks*